Figure 1:
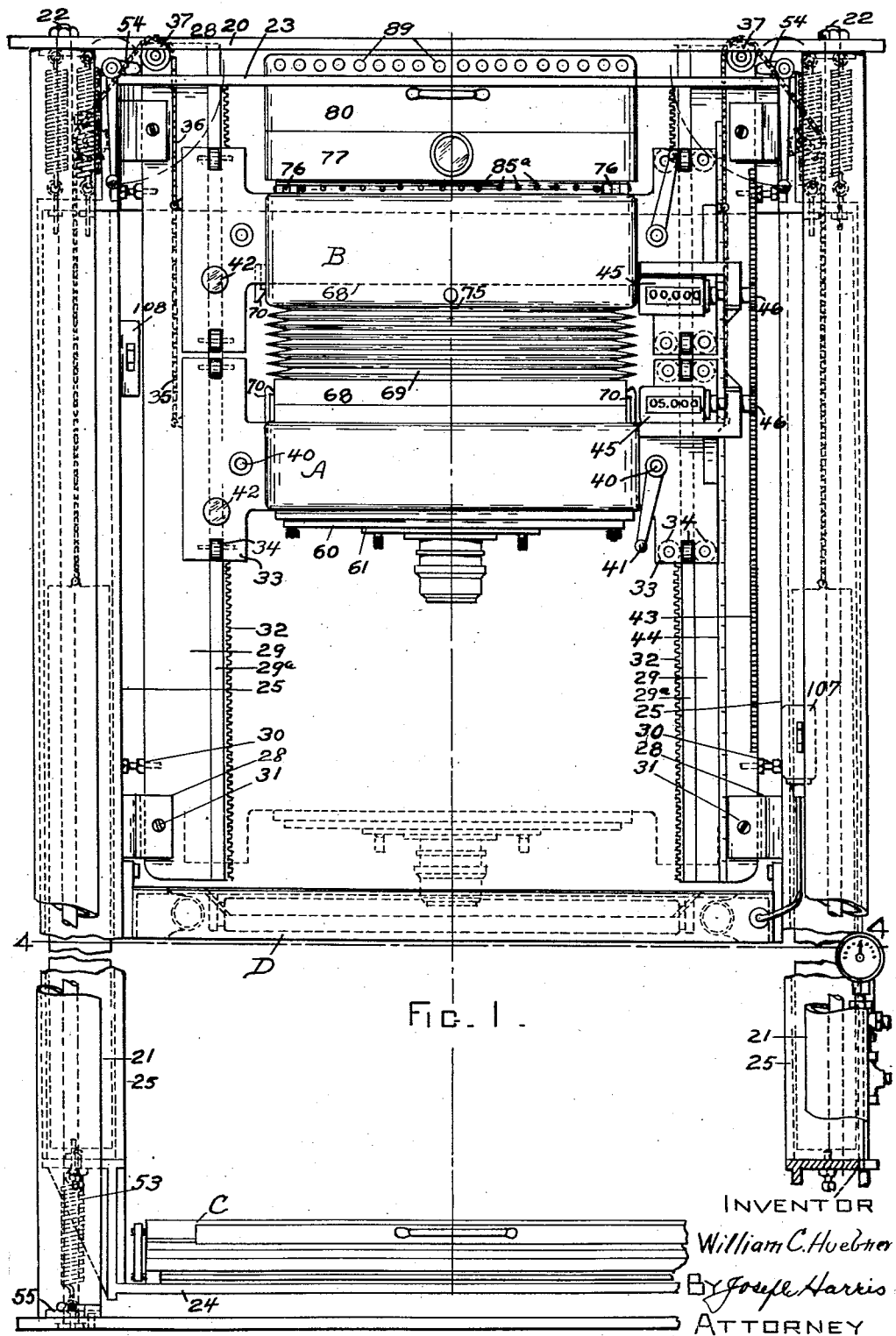

April 11, 1944.  W. C. HUEBNER  2,346,490
VERTICAL PROJECTOR CAMERA
Filed June 17, 1942   9 Sheets-Sheet 1

INVENTOR
William C. Huebner
By Joseph Harris
ATTORNEY

April 11, 1944.   W. C. HUEBNER   2,346,490
VERTICAL PROJECTOR CAMERA
Filed June 17, 1942   9 Sheets-Sheet 4

INVENTOR
William C. Huebner
By Joseph Harris
ATTORNEY

FIG_8_

April 11, 1944.  W. C. HUEBNER  2,346,490
VERTICAL PROJECTOR CAMERA
Filed June 17, 1942  9 Sheets-Sheet 8

INVENTOR
William C. Huebner
BY Joseph Harris
ATTORNEY

April 11, 1944.   W. C. HUEBNER   2,346,490
VERTICAL PROJECTOR CAMERA
Filed June 17, 1942   9 Sheets-Sheet 9
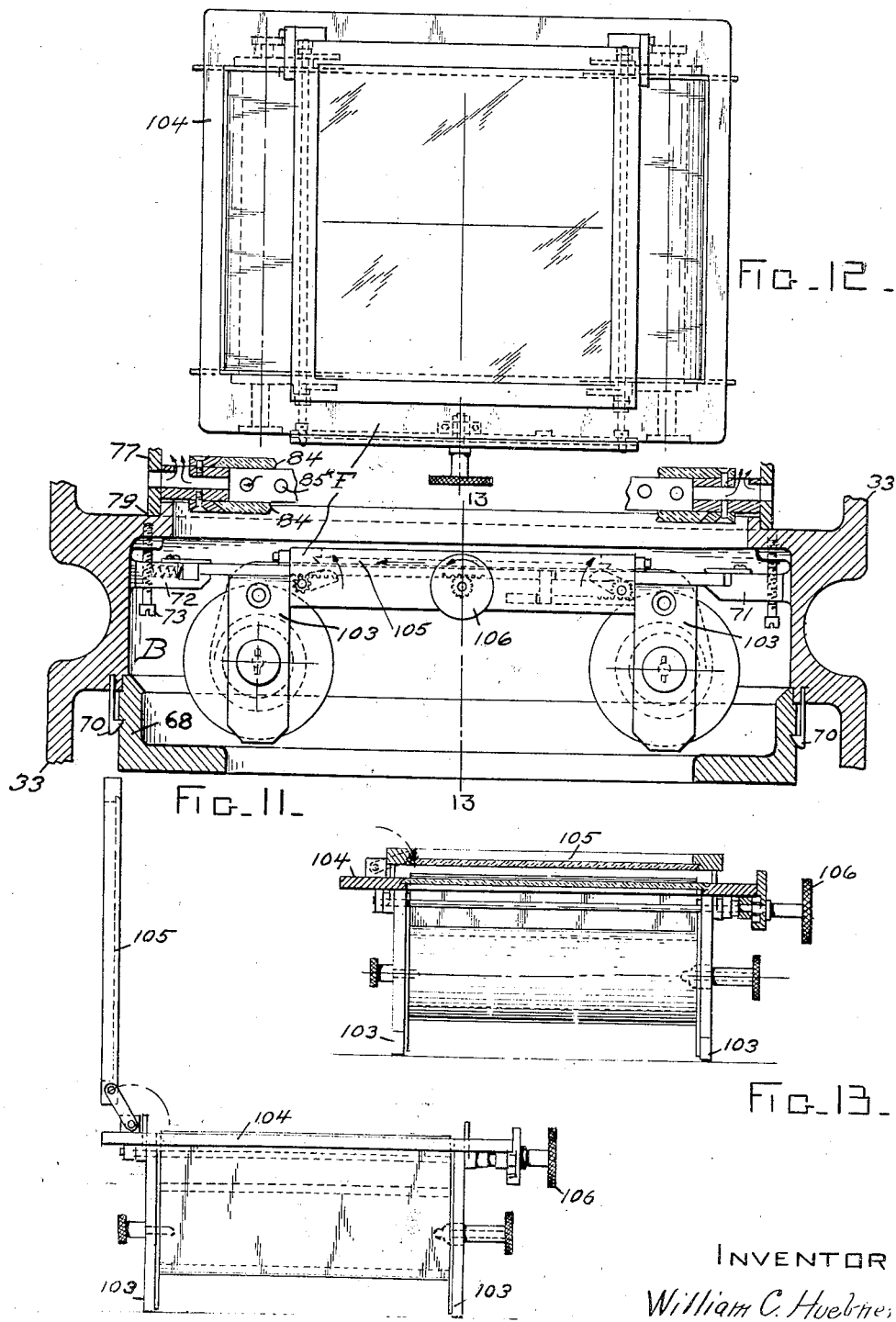
INVENTOR
William C. Huebner,
BY Joseph Harris
ATTORNEY Patented Apr. 11, 1944

2,346,490

UNITED STATES PATENT OFFICE 2,346,490

VERTICAL PROJECTOR CAMERA

William C. Huebner, New York, N. Y.

Application June 17, 1942, Serial No. 447,331

12 Claims. (Cl. 88—24)

This invention relates to improvements in vertical projector cameras and the invention described or shown herein may be manufactured and used by or for the Government for governmental purposes, without the payment to applicant of any royalty thereon.

One object of this invention is to provide a combined projector and camera of vertical type which occupies a minimum of space for production of work of a given size and wherein a full floating structure is incorporated that will completely absorb all detrimental vibration, thereby insuring accurate and clear photographic reproductions.

More specifically, an object of the invention is to provide a camera of the type indicated in the preceding paragraph which is especially adapted for use by the armed forces in mobile map reproduction trains, on ships, in or on trucks, trailers and other transportation equipment that may be carrying other heavy apparatus such as presses or the like and which transportation equipment will ordinarily be subject to relatively heavy vibrations.

Another object of the invention is to provide a projection camera which will permit projection of enlargements or images from comparatively small areas of films or plates to large areas of photo-sensitive materials held horizontally at the bottom of the structure and, conversely, permit making of negative or positive images from copy held horizontal at the bottom of the structure, upon flat plates, cut film, or roll film.

Ancillary to the immediately preceding object of the invention is to provide effective suitable illuminating means selectively operable for both the projecting photography and reproductions.

Further objects of the invention are: to provide means for reading the exact location of the plane of the image relative to the photo-sensitive material in projections as well as the exact location of the lens for both projection and copy reproductions; to provide means for easy and rapid adjustment of carriages carrying the lens and film, roll or plate, to exact predetermined positions and locking the carriages against displacements during exposure; to provide a light-tight camera carriage adapted to utilize either a portable roll film carrier, a flat plate, or a cut film carrier such that the sensitized surface of each will occupy the same predetermined plane relative to and parallel with the plane of the copy holder; to provide suitable light-tight heat dissipating means for the light chamber; to provide means for locking the floating chassis and parts mounted thereon to the main housing or support to thereby insure against injury during transit; and also to so arrange all of the operating parts, interchangeable parts, indicators, etc., that the same are accessible to the operator for manipulation and servicing from one side only of the camera.

Other objects of the invention will more clearly appear from the description and claims hereinafter following.

Figure 2:
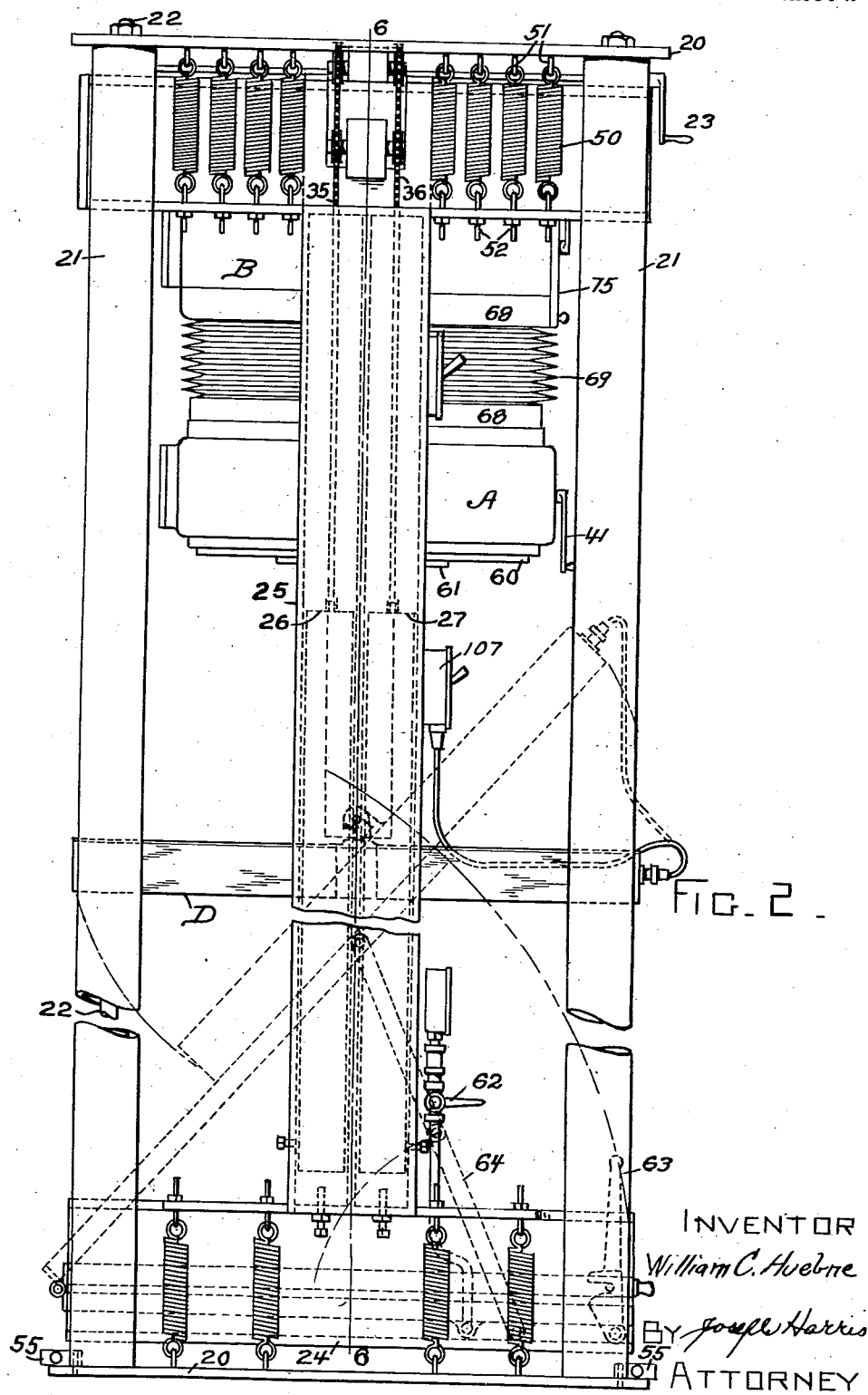
Figure 3:
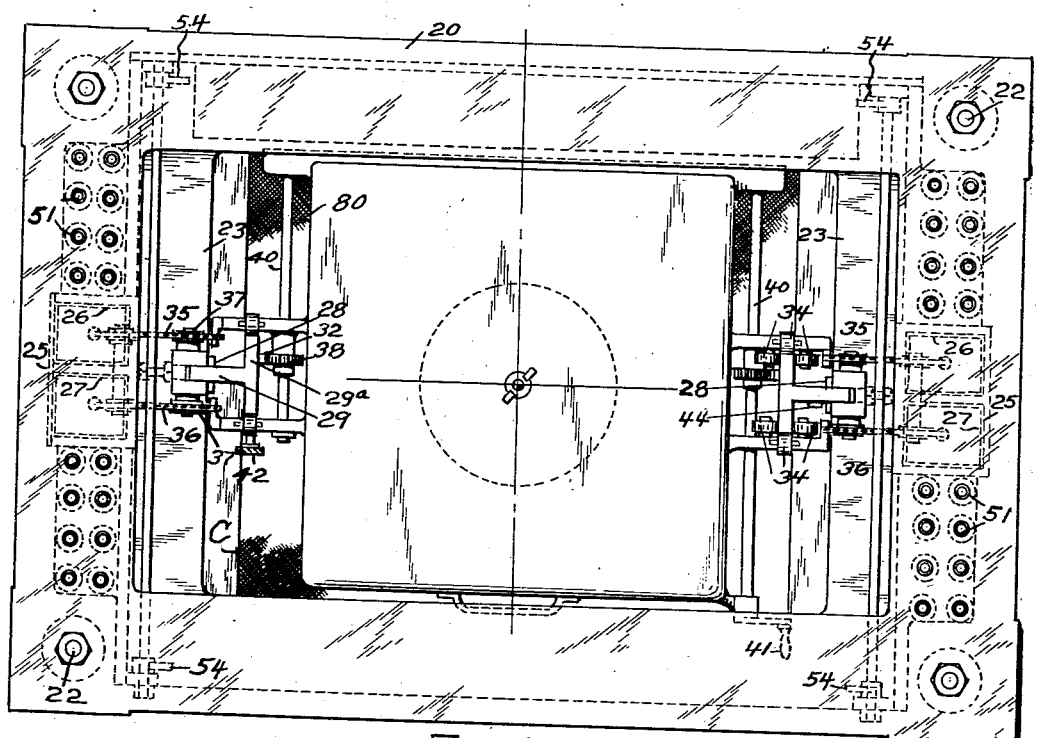
Figure 4:
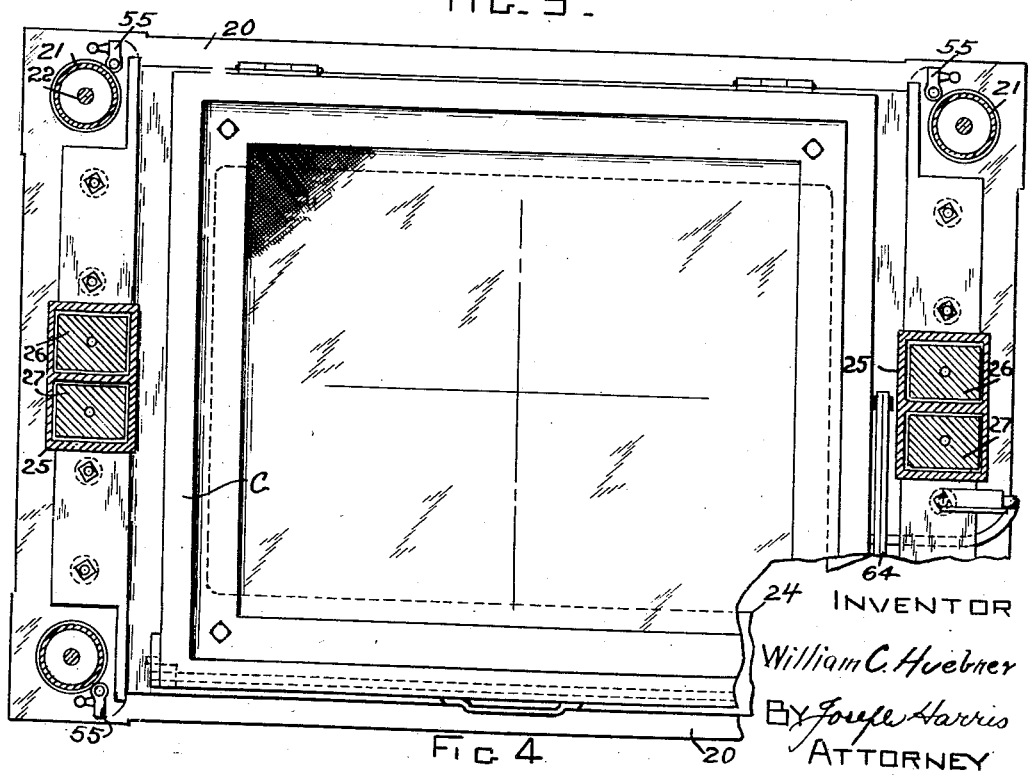
Figure 5:
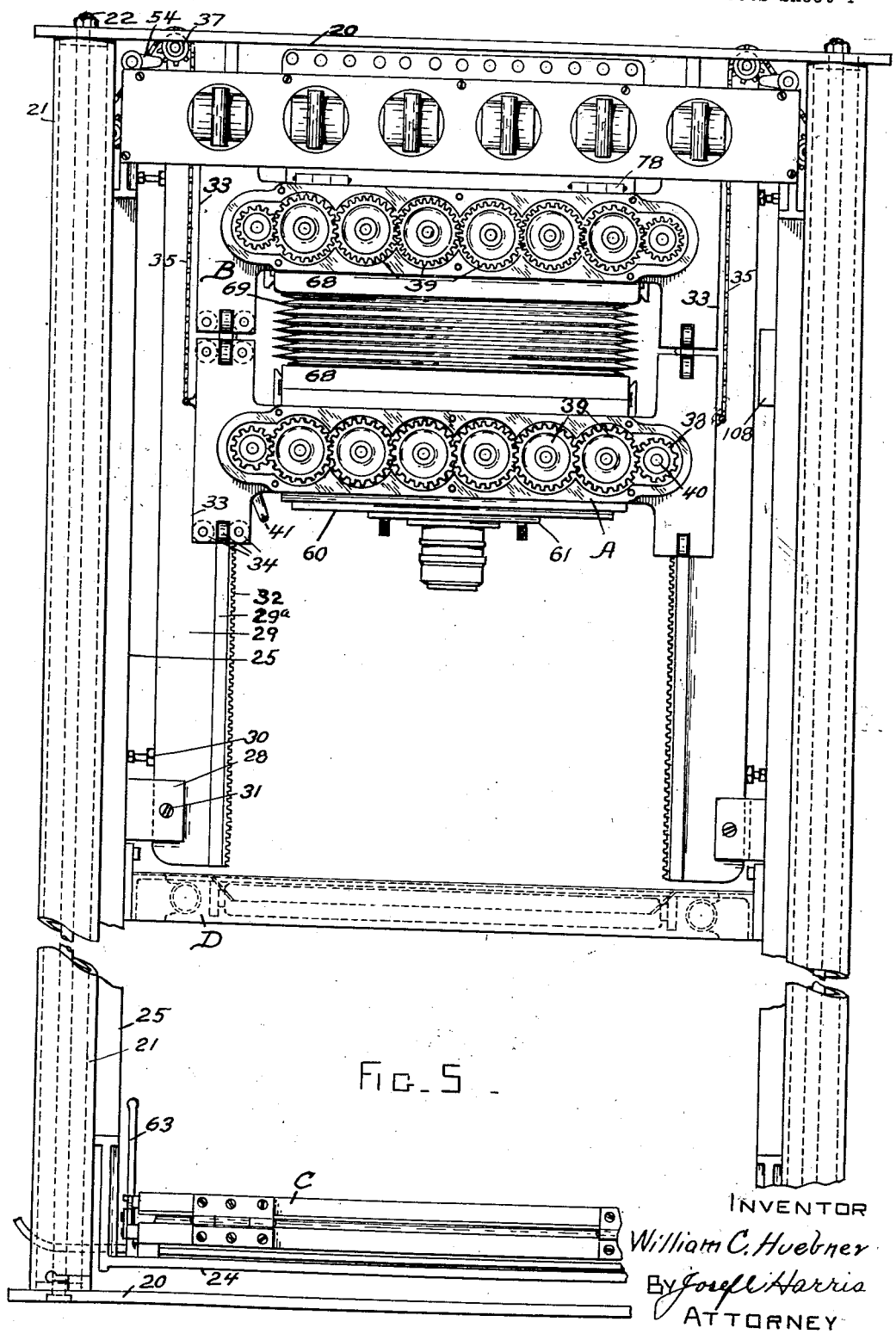
Figure 6:
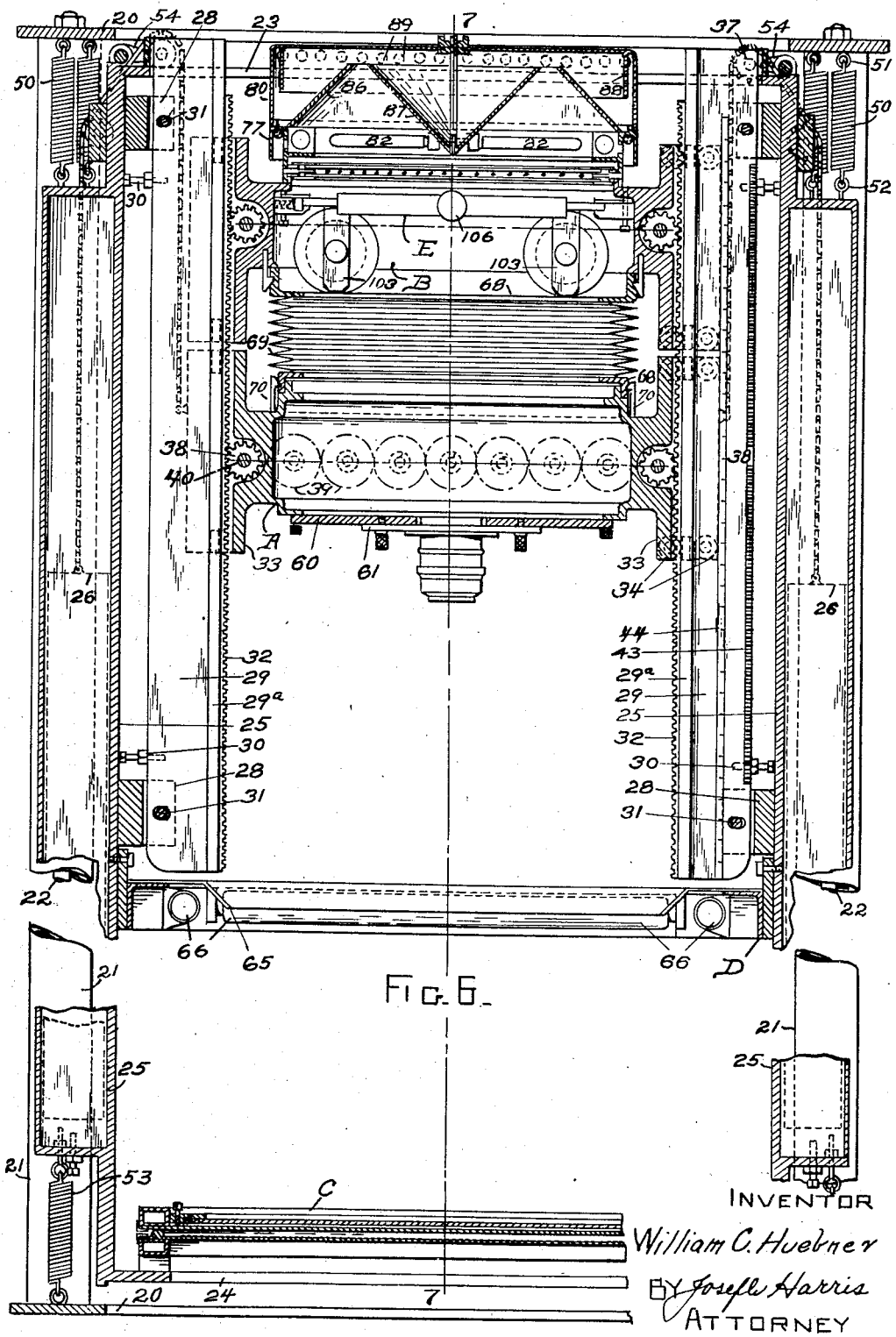
Figure 7:
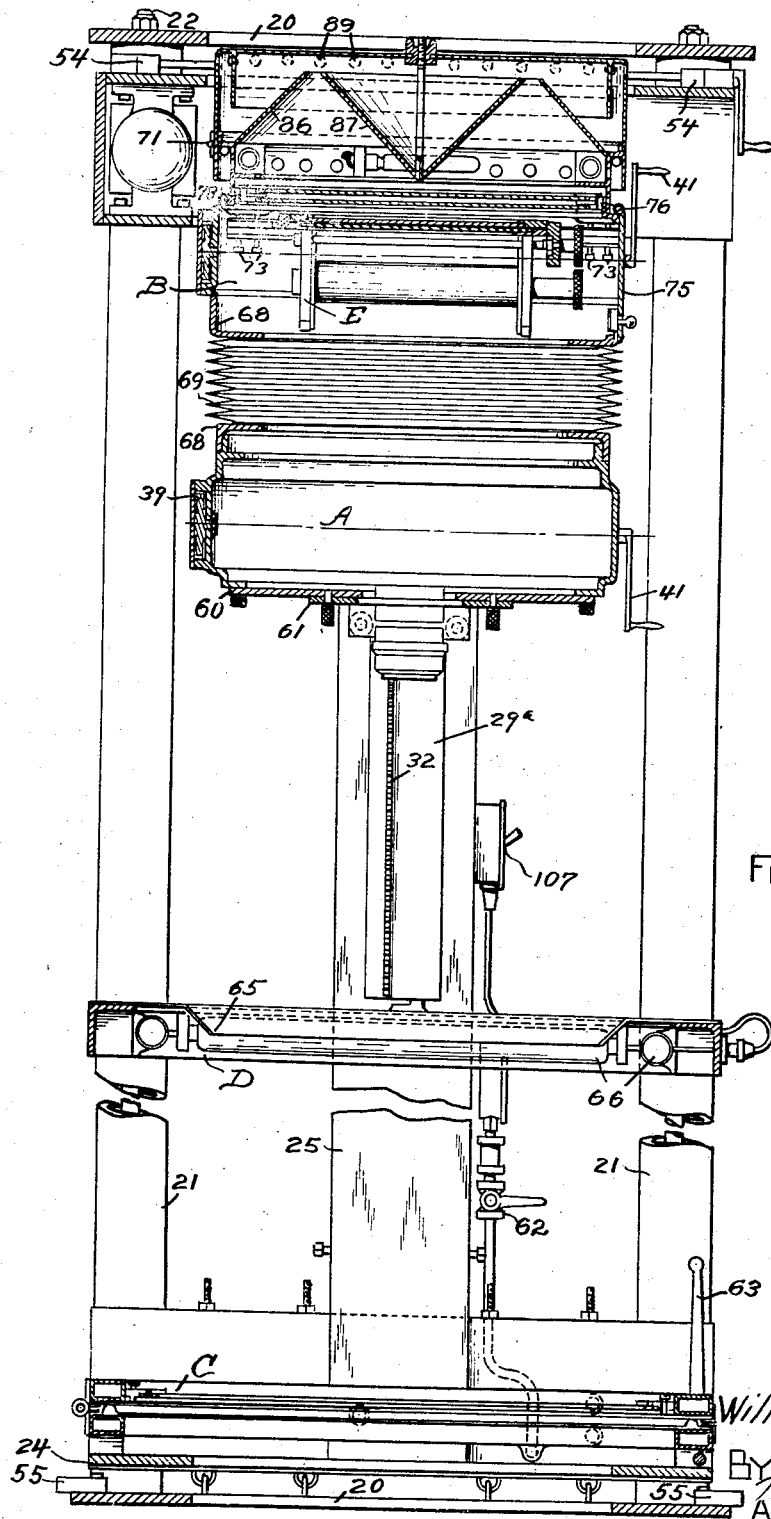
Figure 8:
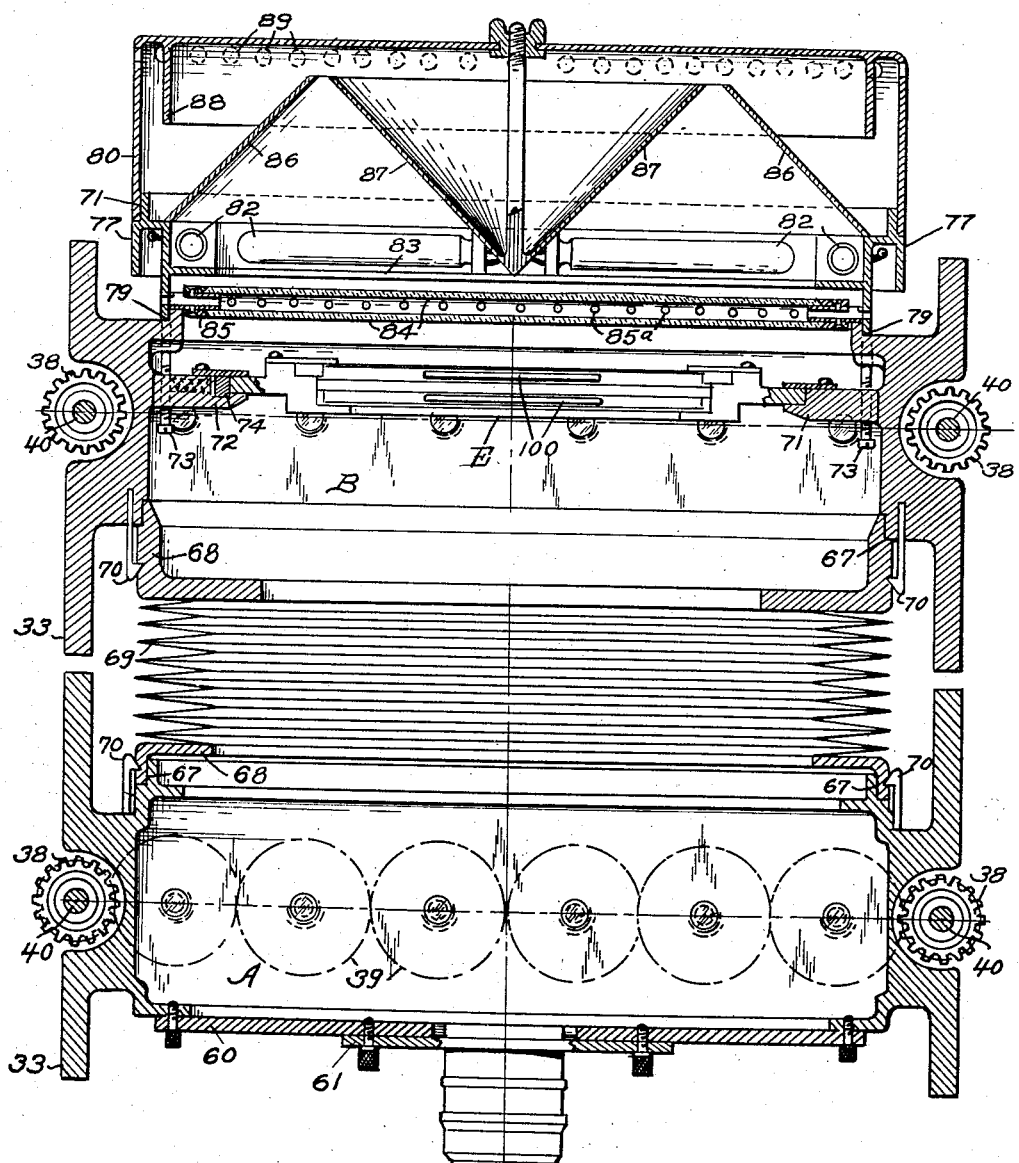
Figure 9:
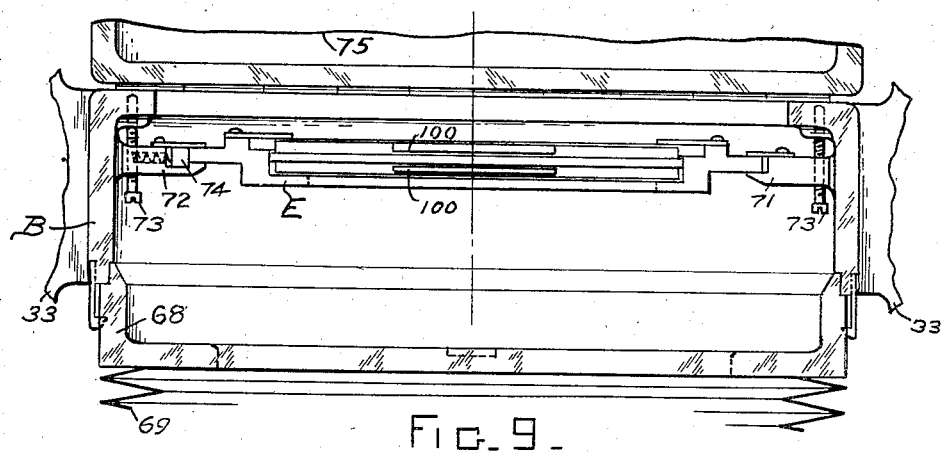
Figure 10:
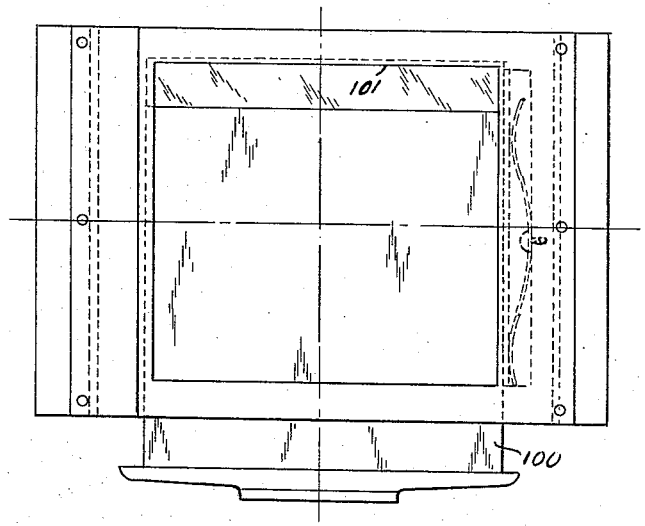

In the drawings forming a part of this specification, Fig. 1 is a front elevation of a projector camera embodying the invention, parts being broken away to better accommodate the view on the sheet. Fig. 2 is a side elevation of the camera shown in Fig. 1, parts likewise being broken away to better accommodate the view on the sheet. Fig. 3 is a top plan of the structure shown in Fig. 1. Fig. 4 is a horizontal sectional view corresponding substantially to the line 4—4 of Fig. 1. Fig. 5 is a rear elevational view of the camera with certain plates on the lens and camera carriages removed to show the train of pinions by which the carriages are actuated. Fig. 6 is a vertical sectional view corresponding substantially to the line 6—6 of Fig. 1. Fig. 7 is a vertical sectional view corresponding substatially to the lie 7—7 of Fig. 6. Fig. 8 is an enlarged vertical sectional view corresponding substantially to the two carriages of the projector camera, Fig. 8 differing from the preceding sectional views in that a plate carrier is shown supported in the camera carriage instead of a roll film carrier. Fig. 9 is a detail elevational view of the camera carriage showing the displaceable side or panel open and partly broken away to better acccommodate the view on the sheet. Fig. 10 is a top plan view of the plate carrier shown in Fig. 9. Fig. 11 is a detail vertical sectional view on an enlarged scale of the camera carriage illustrating the same supplied with a roll film carrier. Fig. 12 is a top plan view of the roll film carrier. Fig. 13 is a vertical sectional view corresponding substantially to the line 13—13 of Fig. 11. And Fig. 14 is an end elevational view of the roll film carrier showing the flattening plate elevated.

In carrying out the invention in the preferred form illustrated, the same comprises, in its broadest aspects, a vertically extending main frame or supporting structure of heavy skeletonized form; a camera chassis vertically suspended by springs within the main frame; a holder at the bottom of the chassis disposed horizontally; lens and camera carriages vertically slidably mounted on the chassis; and illuminating means for both projection and reproduction together with ancillary means for manipulating and operating the several parts of the camera.

In carrying out the invention, the main or supporting frame preferably comprises top and bottom rectangular frames 20—20 between which are interposed four tubular standards 21—21 at the four corners thereof and all of which are securely rigidly locked together by suitable means such as the bolts 22—22 extending through the posts and frames.

The camera chassis, which is full floating with respect to the main frame or support and which is disposed within the main frame, preferably comprises top and bottom rectangular frames 23 and 24 which are rigidly united by special side connecting members 25—25 of cross section best shown in Fig. 4. Each of the latter, as there shown, is of double tubular formation to form vertical guides and housings for two sets of counterweights 26—26 and 27—27 for the purpose hereinafter described.

To yieldingly support the chassis and to eliminate any and all vibrations transmitted to the main stationary frame from being transmitted to the chassis, the latter is suspended from the top frame 20 of the main frame by two large clusters of preferably coiled springs 50—50 disposed on opposite sides of the camera, said springs being suitably secured to the main frame and chassis by eye bolts 51 and 52, the latter being such that the tension can be adjusted by the nuts thereon as will be apparent. To eliminate side sway or pendulum action, two more sets or clusters of springs 53—53 are preferably interposed between the bottom frame 54 of the chassis and the bottom plate 20 of the main frame and connected to the respective members also by eye bolts one set of which can be adjusted so as to regulate the tension as will be understood. By the construction shown and described, it is evident that the chassis is entirely floating so that shocks from vibration or the like can not be transmitted thereto, thus insuring clear and accurate photographic reproductions by the parts carried by the chassis. When the camera is not in use and particularly during transportation, it is desirable to lock the chassis and all of the parts carried thereby with respect to the main frame for which purpose any suitable means may be employed such as the pivoted cam levers 54—54 mounted on the top of the chassis and adapted to engage the top plate 20 of the main frame and depress the chassis against the tension of the springs and to insure depressed position, the chassis may be additionally locked at the bottom thereof by suitable latches 55—55 carried by the bottom plate of the main frame and arranged to interlock with the bottom member of the chassis.

Carried by the side members 25 on the inner opposed faces thereof are blocks 28—28 which adjustably receive therein vertically disposed guide rails 29—29 each of the latter being of generally T formation as best shown in Fig. 3. The guide rails are adapted to be accurately vertically aligned by means of suitable adjusting screws and nuts indicated at 30—30 interposed between the rails and the side members 25 as shown in Figs. 1, 5, and 6. The rails are held by suitable means such as the pins 31—31 extended through the blocks 28 and the guide rails as shown. On the inner face of each of the cross flanges 29a of the rails is provided a vertically extending rack 32.

Vertically slidably mounted on the guide rails are two carriages designated broadly by the reference characters A and B. Each of said carriages is provided at each end thereof with a guide bearing block 33 which is forked to straddle the cross flange 29a of the corresponding guide rail, said blocks 33 being provided with sets of anti-friction rollers 34—34 in groups of three which engage the opposite sides and edges of the cross flange of the guide rail so as to insure easy and at all times aligned vertical adjustment of the carriages as will be understood. To facilitate the adjustment of the carriages A and B, the carriage A is connected at each end thereof by means of the chain 35 with a counterweight 26 and, similarly, the carriage B by means of chain 36 with the counterweight 27, said chains passing over suitable sprocket gears 37 carried by the top frame 23.

To actuate the carriages A and B vertically and to insure simultaneous equal movement at each end thereof, each of said carriages is provided with two end gears 38—38 cooperable with the respective adjacent racks 32, said end gears 38 having interposed therebetween a train of pinions 39 as best shown in Fig. 5. One of the end gears 38 of each set is mounted on a shaft 40 extended to the front side of the camera where the shaft is adapted to detachably receive an operating crank handle 41. The train of pinions is preferably disposed within suitable recesses provided on the back side of the housing, the shafts therefor being journaled in suitable bearings drilled in the carriage wall and retained in place by a cover plate which is omitted or removed from the Fig. 5 illustration. By the means just described, it is evident that each of the carriages A and B may be readily adjusted up or down the desired amount by manipulating the proper crank handle 41 and each carriage is also adapted to be locked in position by suitable means such as a set screw 42 threaded through one of the guide blocks 33 of the carriage and so positioned to engage the edge of the cross member 29a of the guiding rail. In actual practice, the set of locking screws 42 will preferably be made of relatively soft material so as not to injure the guiding surface of the guide rail with which it engages.

To indicate the amount of travel and the exact position of each of the carriages A and B, the following indicating mechanism is preferably employed. Secured to one of the guide rails 29, preferably the right hand guide rail as shown in Fig. 1, is another vertically extending rack 43 and adjacent which is disposed an indicator scale 44. Mounted on each of the carriages A and B is a counter indicator illustrated conventionally at 45, each of the same being provided with a drive pinion or gear 46 cooperable with the rack 43. In actual practice, the counter will indicate minute divisions of inches as will be understood.

The lens carriage A, is shown in Figs. 6 and 8, is of chambered construction with openings at the top and bottom thereof. To the bottom side of the carriage A is adapted to be detachably secured a lens board 60 and to the latter in turn is detachably secured the lens carrying plate 61 so as to permit interchange of lenses for different classes of work.

On the bottom horizontal frame 24 of the chassis is carried the holder designated broadly by the reference character C. The latter may be of any suitable construction adapted to hold either copy material or photo-sensitive material in a horizontal plane, that is, normal to the vertical axis of the camera, said holder preferably being of the vacuum type, the suction for which may be controlled as by the shut-off cock 62 indicated conventionally in Fig. 2 in connection with a pressure indicator and suitable flexible connection to the holder. The swinging upper frame of the holder C is adapted to be held down in locked position by any suitable means such as the latch lever 63 indicated by dotted lines in Fig. 2 and upper section of the holder may be swung upwardly to the dotted line position indicated and there held by a strut 64 when inserting or removing the copy or photo-sensitive material, as will be understood.

To illuminate copy held in or on the holder C for reproductions to provide negatives or positives, suitable illuminating means are carried by the chassis as indicated broadly at D. Said illuminaing means preferably comprises a rectangular frame with a large central opening or aperture 65 of such area to permit projection of images up to the maximum size down to the holder C, said illuminating means being provided with mercury or other light bulbs 66—66 so positioned on the under side of the frame as to throw the light downwardly toward the holder C when the latter is utilizing copy for reproduction purposes.

Referring now more particularly to Fig. 8, the two carriages A and B, as there shown, are preferably provided on their opposed faces with shouldered flanges as indicated at 67—67 extending therearound and over which are adapted to be telescoped the flanged end frames 68—68 to which the opposite ends of the bellows 69 are attached. The frames 68 are adapted to be secured to their respective carriages by suitable means such as the spring latches 70—70, thus providing a light-tight expansible connection between the two carriages A and B.

The upper or camera carriage B is generally similar to the carriage A except that it is provided with means for holding carriers for plates, cut film, and roll film. For this purpose, as best shown in Fig. 8 where a plate carrier E is shown in position, the carriage B is provided on the interior thereof on each side, with horizontally extending supporting and guide flanges 71 and 72. Each of said guide flanges is slidably keyed to the corresponding adjacent wall of the carriage housing and is adapted to be vertically adjusted as by means of the adjusting screws 73—73 so as to insure accurate alignment of the guiding flanges and also insure the predetermined position within the carriage housing relative to the axis of the camera and counter indicators. The guide flange 72 is also preferably provided with an inwardly spring-influenced bar 74 to engage the corresponding adjacent edge of the carrier E so as to insure the accurate positioning of the latter transversely with respect to the axis of the camera. To permit easy access to the interior of the camera carriage B for insertion and removal of the plates, film and roll films, the front wall or panel of the carriage housing B as indicated at 75 is hinged to the main body of the carriage as indicated at 76 so that the side of panel 75 may be swung up as indicated in Fig. 9. Mounted on the top side of the camera carriage B are the illuminating and light-diffusing means when the apparatus is employed for projection purposes. Said means preferably comprises a light box consisting of a rectangular light frame 77. The latter is preferably hinged along its rear side as indicated at 78 to the carriage B and, when in closed position, is telescoped over a flange 79 of the carriage housing so as to provide a light-tight sealed connection therewith. Also preferably pivotally connected to the light frame 77 is the reflector box 80 in turn having a telescoped light-tight sealed connection therewith as indicated at 71. The light frame 77 has an enlarged central opening and around the same are disposed the light bulbs 82-82 and beneath which is a horizontally extending flange 83 to prevent direct transmission of light downwardly as will be apparent. Carried by the light frame 77 are preferably two light-diffusing plates 84—84 carried by flange 85, said plates being separated as indicated in Fig. 8, the space therebetween being vented to the atmosphere as by the series of vent holes 85 extending therearound. To insure uniform distribution of the light to the diffuser plates, the reflector box is provided on the interior thereof with upwardly converging reflectors 86 and an inverted centrally disposed reflector cone 87. To provide additional ventilation for the heat generated by the illuminating means and, at the same time, prevent escape of light to the outside, the reflector box is provided with a depending flange 88 from the top wall thereof and extending around the box at a spaced interval from the outside wall of the box. Vent holes 89 are then provided in the outer wall adjacent the top of the channel formed by the flange 88 and outer wall of the box. In order that the projector camera may have maximum utility, particularly in army field work under difficult conditions and where a wide variety of photographic work is required, the present invention contemplates the use of either flat plates, cut film or roll film for the purpose of making negative or positive images. To this end, the carriers, one of which has heretofore been referred to by the reference character E, are made interchangeable. The carrier E, as hereinbefore described, is adapted to be held in predetermined location in the carriage B as shown in Figs. 8 and 9. Said carrier E is provided with removable shutters 100 and flat plate 101 as shown. In Figs. 6 and 11 to 14 is shown a roll film carrier F adapted to be inserted and removed in the manner similar to that of the carrier E. The roll film carrier F is provided with dependent arms 103—103 which carry the respective winding and unwinding spools for the film which is passed over a table or supporting surface 104 on the carrier. In utilizing film, it is highly essential that the same be maintained perfectly flat during an exposure and for this purpose, a flattened plate of transparent material 105 is so pivotally connected to the carrier F that it may be swung down over and in engagement with the film or upwardly as shown in Fig. 14. Any suitable means such as indicated conventionally at 106 in Fig. 11 may be employed for operating the frame containing transparent plate 105 so that the film may be freely moved to a new position without being injured by rubbing or abrasion. The film roll carrier and parts thereon is so constructed that the plane of the film will lie in exactly the same plane as that of the plate or cut film, thus insuring the known position of the plane of the material to be exposed with reference to the camera housing B and hence with respect to the lens housing and copy by the readings of the counters.

The electric switch for controlling the illuminating means D will preferably be mounted on the chassis at the front thereof as indicated at 107 and similarly the control switch for the projecting illuminating means may be mounted at the front of the chassis as indicated at 108.

With the construction shown and described, it is apparent that the apparatus may be utilized for either projecting images to photo-sensitive material supported on the bottom holder or for reproduction of copy held on the holder to film or plates contained within the camera carriage B. It will further be observed that all parts which have to be manipulated or serviced are accessible from the one side of the apparatus, thereby facilitating the photographic reproductions particularly where space is at a premium. In actual practice, an apparatus in accordance with the disclosure occupying a space of 30 inches by 42 inches by 64 inches high is enabled to obtain reproductions or enlargements in the ratio of 3 to 1 and enlargements up to a size of 24 by 26 inches.

Although there has herein been shown and described what is now considered the preferred manner of carrying out the invention, the same is by way of illustration only and all changes and modifications are contemplated that come within the scope of the claims hereto appended.

What is claimed is:

1. A projector camera having its axis disposed vertically, comprising: a vertically extending relatively stationary main frame; a camera chassis having vertically disposed guide rails; yieldable means interposed between the main frame and chassis for yieldingly sustaining the latter relative to the main frame; means carried by and located adjacent the bottom of the chassis for holding copy or photo-sensitive material in a plane normal to the camera axis; a lens carriage vertically slidably mounted on said guide rails; a camera carriage also vertically slidably mounted on said rails above the lens carriage and provided with means for interchangeably holding an image-carrying element or photo-sensitive element in a plane normal to the camera axis; and illuminating means.

2. A camera of the character described comprising: a vertically extending relatively stationary main frame; a rigidified camera chassis having vertically disposed guide rails; spring means interposed between the tops of the frame and chassis for yieldingly suspending the latter; a horizontally disposed holder carried by the chassis adjacent the bottom thereof; a lens carriage mounted on said guide rails; a camera carriage also mounted on said guide rails; means for independently adjusting each of said carriages vertically along the rails; and illuminating means mounted on and movable in unison with said camera carriage.

3. A camera of the character described comprising: a vertically extending relatively stationary main frame; a rigidified camera chassis having vertically disposed guide rails; spring means interposed between the tops of the frame and chassis for yieldingly suspending the latter; a horizontally disposed holder carried by the chassis adjacent the bottom thereof; a lens carriage mounted on said guide rails; a camera carriage also mounted on said guide rails; means for independently adjusting each of said carriages vertically along the rails; illuminating means located intermediate the lens carriage and said holder; and illuminating means mounted on said camera carriage on the side remote from the lens carriage.

4. A camera of the character described comprising: a vertically extending relatively stationary main frame; a camera chassis having vertically disposed guide rails; yieldable means interposed between the main frame and chassis for yieldingly sustaining the latter relative to the main frame; a holder carried by and located adjacent the bottom of the chassis and having its supporting surface disposed normal to the camera axis; a lens carriage vertically slidably mounted on said guide rails; a second carriage also vertically slidably mounted on said guide rails and disposed above the lens carriage, said second named carriage being of enclosed type with a displaceable panel on one side thereof to provide access to its interior, said second named carriage having also, on the interior thereof and accessible through said displaceable panel, transversely extending supporting means for detachably supporting plate, cut film, and roll film carriers with the planes of the plate or film disposed normal to the camera axis; and illuminating means.

5. A projector camera having its axis disposed vertically comprising: a vertically extending main frame; a camera chassis having vertically disposed guide rails; yieldable means interposed between the main frame and chassis for yieldingly sustaining the latter relative to the main frame; means carried by and located adjacent the bottom of the chassis for holding copy or photo-sensitive material in a plane normal to the camera axis; a lens carriage vertically slidably mounted on said rails; a chambered camera carriage also vertically slidably mounted on said rails and provided on the interior thereof with means for retaining image bearing or photo-sensitive elements in a plane normal to the camera axis; illuminating means located between the lens carriage and said holder for illuminating copy when disposed on the holder; and illuminating means carried by said camera carriage on the top thereof for projecting images.

6. In photographic apparatus of the character described, the combination with a relatively stationary main frame; of a chassis having vertically disposed guide rails; yieldable means suspending the chassis from the frame; a holder carried by the chassis adjacent the bottom thereof; a lens carriage vertically slidable on said rails; a second carriage disposed above the lens carriage and independently vertically slidable on said rails, said second named carriage having means for retaining an image carrier therein with its plane normal to the axis of the lens; a light box detachably mounted on the top of said second named carriage, said light box being provided on the interior thereof with illuminating means, light-diffusing plate between the illuminating means and image carrier, light reflecting means, and ventilating means.

7. A camera having its axis disposed vertically comprising: a main relatively stationary frame; a camera chassis having vertically disposed guide rails; spring means for yieldingly suspending the chassis from the main frame; a horizontally disposed copy holder mounted on and located adjacent the bottom of the chassis; a lens carriage vertically slidably mounted on said guide rails;

centrally apertured illuminating means located between the lens carriage and holder; a second carriage vertically slidably mounted on said rails and located above the lens carriage; and means for independently adjusting said carriages on said rails.

8. In photographic apparatus of the character described, the combination with: a vertically extending, relatively stationary supporting main frame; of a camera chassis disposed within said main frame, said chassis comprising a framework including vertically extending chambered side members to the inner sides of which are secured vertically disposed guide rails; spring means interposed between the tops of said main frame and chassis for yieldingly suspending the latter; a substantially horizontally disposed holder mounted on and located adjacent the bottom of the chassis; a lens carriage vertically slidably mounted on said guide rails; a camera carriage also vertically slidably mounted on said guide rails; a plurality of counterweights disposed in said chambered side members of the chassis; flexible connections independently connecting each of said carriages with a set of counterweights on each side thereof; and illuminating means.

9. In photographic apparatus of the character described, the combination with: a vertically extending, relatively stationary supporting main frame; of a camera chassis disposed within said main frame, said chassis comprising a framework including vertically extending chambered side members to the inner sides of which are secured vertically disposed guide rails; spring means interposed between the tops of said main frame and chassis for yieldingly suspending the latter; a substantially horizontally disposed holder mounted on and located adjacent the bottom of the chassis; a lens carriage vertically slidably mounted on said guide rails; a camera carriage also vertically slidably mounted on said guide rails; a plurality of counterweights disposed in said chambered side members of the chassis; flexible connections independently connecting each of said carriages with a set of counterweights on each side thereof; illuminating means; and means manually operable to lock the chassis rigidly with respect to the main frame.

10. A projector camera having its axis disposed vertically, comprising: a main supporting frame; a camera chassis having vertically disposed guide rails; spring means yieldingly suspending the chassis from the main frame; a holder carried by the chassis adjacent the bottom of the latter; a lens carriage vertically slidably mounted on said rails; copy illuminating means carried by said chassis and located between the lens carriage and said holder, said means including a frame with enlarged central aperture; a light-tight camera carriage vertically slidable on said guide rails and disposed above the lens carriage; a light box mounted on the top of the camera carriage and light-sealed with respect thereto.

11. In photographic apparatus of the character described, the combination with: a vertically extending, relatively stationary supporting main frame; of a camera chassis disposed within said main frame, said chassis comprising a framework including vertically extending chambered side members to the inner sides of which are secured vertically disposed guide rails; spring means interposed between the tops of said main frame and chassis for yieldingly suspending the latter; a substantially horizontally disposed holder mounted on and located adjacent the bottom of the chassis; a lens carriage vertically slidably mounted on said guide rails; a camera carriage also vertically slidably mounted on said guide rails; a plurality of counterweights disposed in said chambered side members of the chassis; flexible connections independently connecting each of said carriages with a set of counterweights on each side thereof; illuminating means; manually operable means for independently adjusting said carriages, said camera carriage being provided with a displaceable side to permit access to the interior thereof, said displaceable side and operating means all being disposed on the same side of the camera.

12. A projector camera having its axis disposed vertically, comprising: a vertically extending relatively stationary main frame; a vertically disposed camera chassis; yieldable means interposed between said main frame and chassis for yieldingly supporting the latter relative to the main frame; a holder for copy or photo-sensitive material secured to the chassis and located adjacent the bottom thereof; a lens carriage and a camera carriage, each independently vertically adjustable on the chassis, the lens carriage being located between the camera carriage and said holder; means on said camera carriage for interchangeably supporting an image-carrying element or photo-sensitive element; and selectively operable means for illuminating either copy when mounted on said holder or for projecting an image from an image-carrying element when supported on the camera carriage.

WILLIAM C. HUEBNER.